(No Model.)

S. W. PEREGRINE.
DRYING KILN.

No. 438,423. Patented Oct. 14, 1890.

Witnesses
W. P. Keene
James McKim

Inventor
S. W. Peregrine,
by Elli Spear Atty.

UNITED STATES PATENT OFFICE.

SEYMOUR W. PEREGRINE, OF GRAND RAPIDS, MICHIGAN.

DRYING-KILN.

SPECIFICATION forming part of Letters Patent No. 438,423, dated October 14, 1890.

Application filed June 21, 1890. Serial No. 356,190. (No model.)

*To all whom it may concern:*

Be it known that I, SEYMOUR W. PEREGRINE, a citizen of the United States of America, residing at Grand Rapids, in the county of Kent and State of Michigan, have invented certain new and useful Improvements in Drying-Kilns, of which the following is a specification.

My invention relates to drying-kilns, but particularly to the construction of the return-flue for the purpose of utilizing the air again and again, passing it from the end of the kiln opposite that in which the heater is placed through the flue to the end of the kiln containing the heater, the moisture in the air taken up from the green lumber being condensed in the passage of the air through the return-flue. I have shown in an application filed by me on the 4th of April, 1889, Serial No. 305,939, several forms of return-flues, and in the present case I have modified the construction of the flue shown in said application, omitting the deflectors and providing a flue of sinuous shape, thus making a circuitous passage, which, by reason of its shape, effects substantially the same result as the deflectors in my application above referred to, as the moisture-laden air in its passage through the flue impinges first against one side and then the other of the walls of the flue. These walls are of metal and thus serve to condense the moisture carried by the air.

Figure 1:
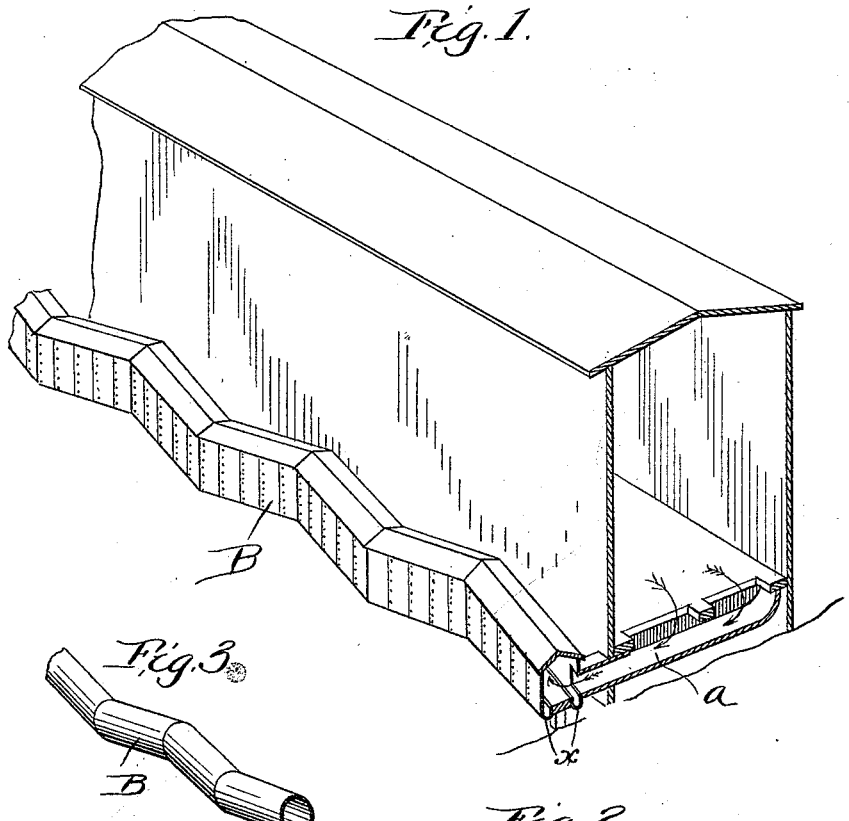
Figure 3:
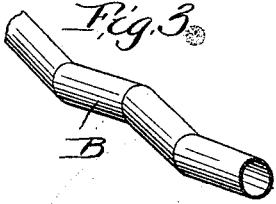
Figure 2:
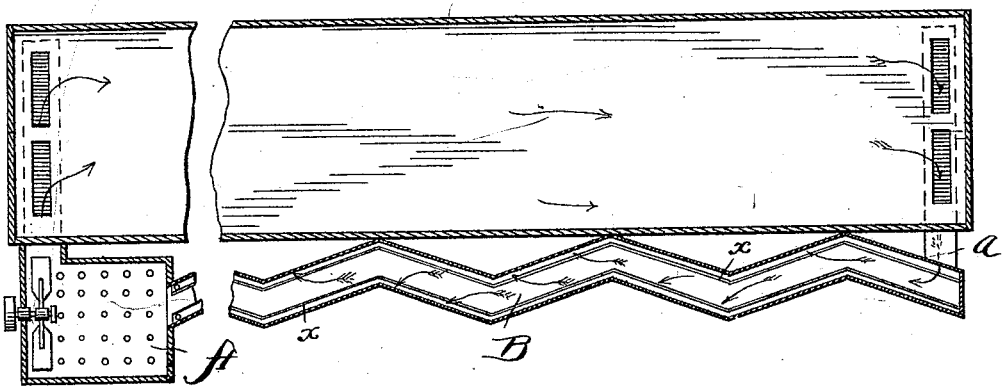

In the accompanying drawings, Figure 1 shows a perspective view of a portion of a kiln with my improved returning-flue connected therewith, and Fig. 2 is a horizontal section taken through the flue. Fig. 3 is a modification.

The kiln may be of any ordinary type, being provided with a heater A at one end, and an opening through the floor at the opposite end, as at *a*, which leads through a passage into the return-flue B, which may be arranged alongside of the kiln or beneath the same. My invention relates particularly to the construction of this return flue or duct. In my application referred to I have provided a return-flue having straight walls, with deflectors arranged within the flue for directing the moisture-laden air against the metallic walls in order to effect condensation and thus dry the air; but in the present case I dispense with the deflectors and form the flues of a sinuous or zigzag shape, (the flues being of any suitable shape in cross-section,) which thus retards the passage of the air and at the same time causes the air to impinge against the walls of the flue, as shown by the arrows in Fig. 2, and in this way contact with the metallic walls is assured and condensation of the moisture effected. The water of condensation is carried off by any suitable trough, as at X.

I do not limit myself to the precise shape of the flue shown, as it may be irregular in other ways in order to effect the same purpose—namely, to provide a circuitous passage and to cause the air in its passage through the same to impinge against the metal walls. Any suitable arrangement of discharge openings or gutters may be provided to carry off the water of condensation. Instead of the walls of the flue being of plain metal, they may be made of corrugated metal.

I claim as my invention—

In combination with a kiln and heating apparatus, a return-flue having connections at its ends with the kiln and heater, respectively, the main portion of said conduit between its connections being formed sinuous to provide a series of deflecting and condensing surfaces against which the moist air impinges, substantially as described.

In testimony whereof I affix my signature in presence of two witnesses.

SEYMOUR W. PEREGRINE.

Witnesses:
C. VAN CLEVE GANSON,
LAURENS W. WOLCOTT.